United States Patent
Castro et al.

(10) Patent No.: US 12,546,937 B2
(45) Date of Patent: Feb. 10, 2026

(54) PHOTONIC FABRIC CHIP DEVICE

(71) Applicant: Panduit Corp., Tinley Park, IL (US)

(72) Inventors: Jose M. Castro, Naperville, IL (US); Richard J. Pimpinella, Prairieville, LA (US); Bulent Kose, Burr Ridge, IL (US); Yu Huang, Orland Park, IL (US); Ronald A. Nordin, Naperville, IL (US); Robert A. Reid, Battle Ground, IN (US)

(73) Assignee: Panduit Corp., Tinley Park, IL (US)

( * ) Notice: Subject to any disclaimer, the term of this patent is extended or adjusted under 35 U.S.C. 154(b) by 471 days.

(21) Appl. No.: 17/989,383

(22) Filed: Nov. 17, 2022

(65) Prior Publication Data

US 2024/0168221 A1    May 23, 2024

(51) Int. Cl.
*G02B 6/12* (2006.01)
*H04Q 11/00* (2006.01)

(52) U.S. Cl.
CPC ..... *G02B 6/12004* (2013.01); *G02B 6/12002* (2013.01); *H04Q 11/0005* (2013.01); *H04Q 2011/0056* (2013.01)

(58) Field of Classification Search
CPC ....................................................... G02B 6/12
USPC ............................................................ 385/14
See application file for complete search history.

(56) References Cited

U.S. PATENT DOCUMENTS

| | | | |
|---|---|---|---|
| 9,154,860 B2 | 10/2015 | Hessong et al. | |
| 11,112,573 B2* | 9/2021 | Shearman | H04B 1/036 |
| 11,635,566 B2* | 4/2023 | Tai | G02B 6/12004 385/14 |
| 11,940,713 B2* | 3/2024 | Falk | G02F 1/3501 |
| 12,055,766 B2* | 8/2024 | Pupalaikis | G02B 6/3628 |
| 12,235,526 B2* | 2/2025 | Li | G02B 1/002 |
| 2015/0037032 A1 | 2/2015 | Xu et al. | |
| 2016/0025942 A1 | 1/2016 | Pepe et al. | |
| 2016/0337727 A1 | 11/2016 | Graves et al. | |
| 2018/0070157 A1 | 3/2018 | Menard et al. | |
| 2020/0196035 A1* | 6/2020 | Rousseaux | G02B 6/3596 |
| 2021/0018697 A1 | 1/2021 | Evans et al. | |
| 2022/0166522 A1* | 5/2022 | Paraiso | H01L 23/38 |
| 2024/0094204 A1* | 3/2024 | Gundavarapu | G01N 21/774 |
| 2024/0097783 A1* | 3/2024 | Rolston | H04L 49/1523 |

* cited by examiner

*Primary Examiner* — Kaveh C Kianni
(74) *Attorney, Agent, or Firm* — Christopher K. Marlow; Christopher S. Clancy; James H. Williams

(57) ABSTRACT

Apparatuses having a plurality of optical duplex and parallel connector adapters, such as MPO connectors and LC adapters, where some adapters connect to network equipment in a network and others to servers or processing units such as GPUs, incorporate internal photonic circuit with a mesh. The light path of each transmitter and receivers is matched in order to provide proper optical connections from transmitting to receiving fibers, wherein complex arbitrary network topologies can be implemented.

1 Claim, 8 Drawing Sheets

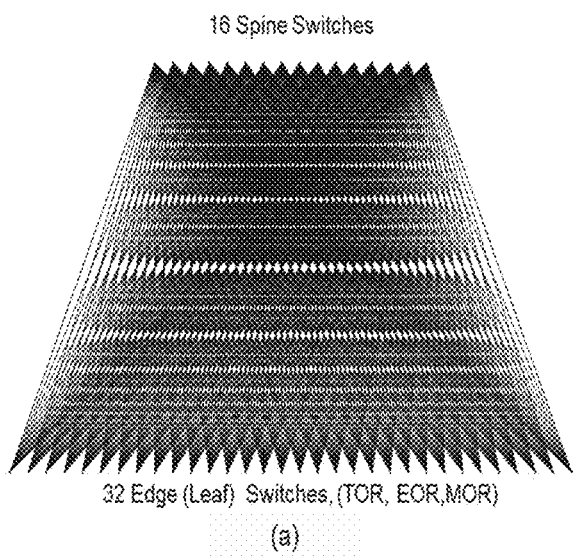 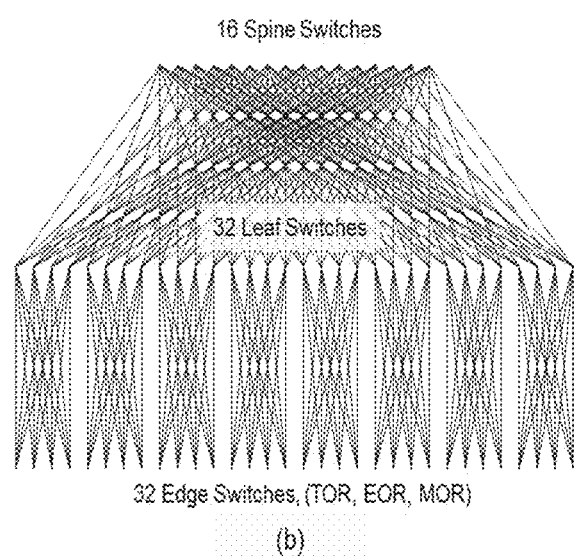
FIG. 1(A)  FIG. 1(B)
Two-level FCN radix 32   Three-level FCN radix 8

Top view of 500 showing interconnection arrangements

Twelve of twenty-four alternative meshes that can be implemented in the submodule 500. All of them can provide the connectivity maps described in this application. The mesh 632 is used in Fig. 7.

Fig 4 - DLWW Optical Chip 700 (a) Top view showing interconnection arrangements (b) side view showing the different layers where the waveguides are written to avoid crossover.

DLWW Optical Chip 700. View from the top with a 45-degree tilt shows waveguides 710 and 720.

Exemplary of module 900 shows connection to DLWW embodiment 700 to two fiber arrays and the connection to the multifiber ports of the module Exemplary of module 400 shows connection to DLWW embodiment 700 to fiber arrays and the connection to the multifiber ports of the module Illustrates a simple method for implementing networks with 16 Leaf Switches and up to 16 Spine switches, using the modules 400.

PHOTONIC FABRIC CHIP DEVICE

FIELD OF INVENTION

Disclosed is an apparatus and method to improve the scalability of Data Center networks using mesh network topologies, switches of various radixes, tiers, and oversubscription ratios. The disclosed apparatus and method reduce the number of manual network connections, simplifying the cabling installation, and improving the flexibility and reliability of the data center at a reduced cost.

BACKGROUND

The use of optical fiber for transmitting communication signals has been rapidly growing in importance due to its high bandwidth, low attenuation, and other distinct advantages, including radiation immunity, small size, and lightweight. Datacenter architectures using optical fiber are evolving to meet the global traffic demands and the increasing number of users and applications. The rise of cloud data centers, particularly the hyperscale cloud, has significantly changed the enterprise information technology (IT) business structure, network systems, and topologies. Moreover, cloud data center requirements are impacting technology roadmaps and standardization.

The wide adoption of server virtualization and advancements in data processing and storage technologies have produced the growth of East-West traffic within the data center. Traditional three-tier switch architectures comprising Core, Aggregation, and Access (CAA) layers cannot provide the low and equalized latency channels required for East-West traffic. Moreover, since the CAA architecture utilizes spanning tree protocol to disable redundant paths and build a loop-free topology, it underutilizes the network capacity.

The Folded Clos network (FCN) or Spine-and-Leaf architecture is a better-suited topology to overcome the limitation of the three-tier CAA networks. A Clos network, a multilevel circuit switching network introduced by Charles Clos in 1953, has become very relevant today due to the use of complex optical interconnect topologies. The Folded-Clos network topology utilizes two types of switch nodes, Spine and Leaf Each Spine is connected to each Leaf. The network can scale horizontally to enable communication between a large number of servers while minimizing the latency and non-uniformity by simply adding more Spine and Leaf switches.

FIG. 1 shows an example of two FCNs with a similar number of hosts, using different radixes and levels. The higher radix, 32 in this example, connects 32 Leaf, switches in a two-layer network, as shown in part (a) of the FIGURE. The two-level FCN provides the lowest latency at the cost of requiring a denser network (512 interconnections). By using a three-layer network, the interconnection layout can become less complex or more structured. However, more switches are needed, and more latency is introduced in the network. During the last years, the need for flatter networks to address the growing traffic among machines has favored the radix increase of the switches' application-specific integrated circuits (ASICs). Currently, switch ASIC radixes can handle 256 ports at a speed of 100 Gb/s per port. ASICs with higher radixes are expected in the future.

Based on industry telecommunications infrastructure Standard TIA-942-A, the locations of leaf and spine switches can be separated by tens or hundreds of meters. Typically, Spine switches are located in the main distribution area (MDA), whereas Leaf switches are located in the equipment distribution area (EDA) or horizontal distribution area (HDA).

This architecture has been proven to deliver high-bandwidth and low latency (only two hops to reach the destination), providing low oversubscription connectivity. However, for large numbers of switches, the Spine-Leaf architecture requires a complex mesh with large numbers of fibers and connectors, which increases the cost and complexity of the installation.

Future data centers will require more flexible and adaptable networks than the traditional mesh currently implemented to accommodate highly distributed computing, machine learning (ML) training loads, high levels of virtualization, and data replication.

Traditionally the mesh fabrics such as the ones shown in FIG. 1 have been implemented over patch panels using hundreds or thousands of patch cords connections to deploy the network topology. More recently, the use of transpose boxes, as shown in the prior art and listed RSs, can help to deploy those networks while reducing installation errors. Transposed boxes implement a section of the network mesh inside a box using multiple duplex fiber connections or optical flex circuits. Optical Flex Circuits, arrays of routed fibers embedded on two layers of polymer, can provide versatile mesh deployment on a flexible substrate.

A better way to implement the meshes using planar lightwave circuits (PLC) to implement today's complex mesh topologies has been considered. Currently, most of the PLC methods involve photolithography and etching over silicon wafers. However, waveguides fabricated using photolithography limit the device fabrication to 2D configurations. Therefore, using the photolithography process, meshes needed to implement topologies similar to the ones shown in FIG. 1 will require multiple crossovers, producing high losses and crosstalk.

A more recent fabrication method is direct laser writing waveguide on glass (DLWW) using femtosecond lasers.

A femtosecond laser, which produces high-intensity pulses that last 10 s or 100 s of femtoseconds, enables efficient nonlinear absorption of several near-infrared (NIR) photons to modify the glass properties. The nonlinear absorption of NIR pulses is less damaging than UV absorption and facilitates the use of versatile optics to control the intensity spatial profile in the three dimensions inside a glass. There has been significant progress in DLWW during the last decade to reduce waveguide distortions and other defects that degrade propagation and coupling losses [4].

These most recent techniques, used for DLWW, can implement complex 3D photonic circuits (PCs), and facilitate rapid maskless prototyping. DLWW can fabricate waveguides with similar properties to single-mode fiber, SMF, which is advantageous in reducing the coupling losses. DLWW enables 3D geometries which practically eliminate the waveguide crossover and crosstalk among channels.

DLWW can be a useful technique for manufacturing 3D multichannel optical meshes. However, there are two main limitations of DLWW that require careful design of the waveguides: the propagation losses, which are higher or at best similar to the ones produced by the lithography processes mentioned previously, and bend losses caused by the relatively low index contrast of the waveguides.

Mesh DLWW small form factor designs with low loss, and negligible crosstalk to overcome the limitations mentioned above, are disclosed here.

SUMMARY

Apparatuses having a plurality of optical duplex and parallel connector adapters, such as MPO connectors and LC adapters, where some adapters connect to network equipment in a network and others to servers or processing units such as GPUs, incorporate internal photonic circuit with a mesh. The light path of each transmitter and receivers is matched in order to provide proper optical connections from transmitting to receiving fibers, wherein complex arbitrary network topologies can be implemented.

BRIEF DESCRIPTION OF THE DRAWINGS

FIG. 1(a) shows a two-level FCN radix 32.
FIG. 1(b) shows a three-level FCN radix 8.

DESCRIPTION OF INVENTION

DLWW, a relatively new technique, can enable the fabrication of optical mesh waveguides with index contrast and circular shapes closer to single-mode fiber, SMF, so that the waveguide dimensions are comparable thereby reducing the coupling losses. Moreover, 3D geometries enabled by DLWW practically eliminate the crossover of waveguides and, therefore, the optical crosstalk among channels. However, this technology has limitations, such as propagation and bending losses, tight tolerances, and requiring a careful waveguide design.

An advantage of the invention disclosed in this document is to provide small form factor meshes capable of supporting communication signals transmitted over multiple channels, with negligible crosstalk or noise penalties and limited excess losses beyond the designed split ratio.

The present invention focuses on transmitters with four and eight channels, such as 400GBASE-DR4. Several embodiments will be shown in this section. Note that all the drawings are not to scale to emphasize the main features of the devices.

Figure 2:
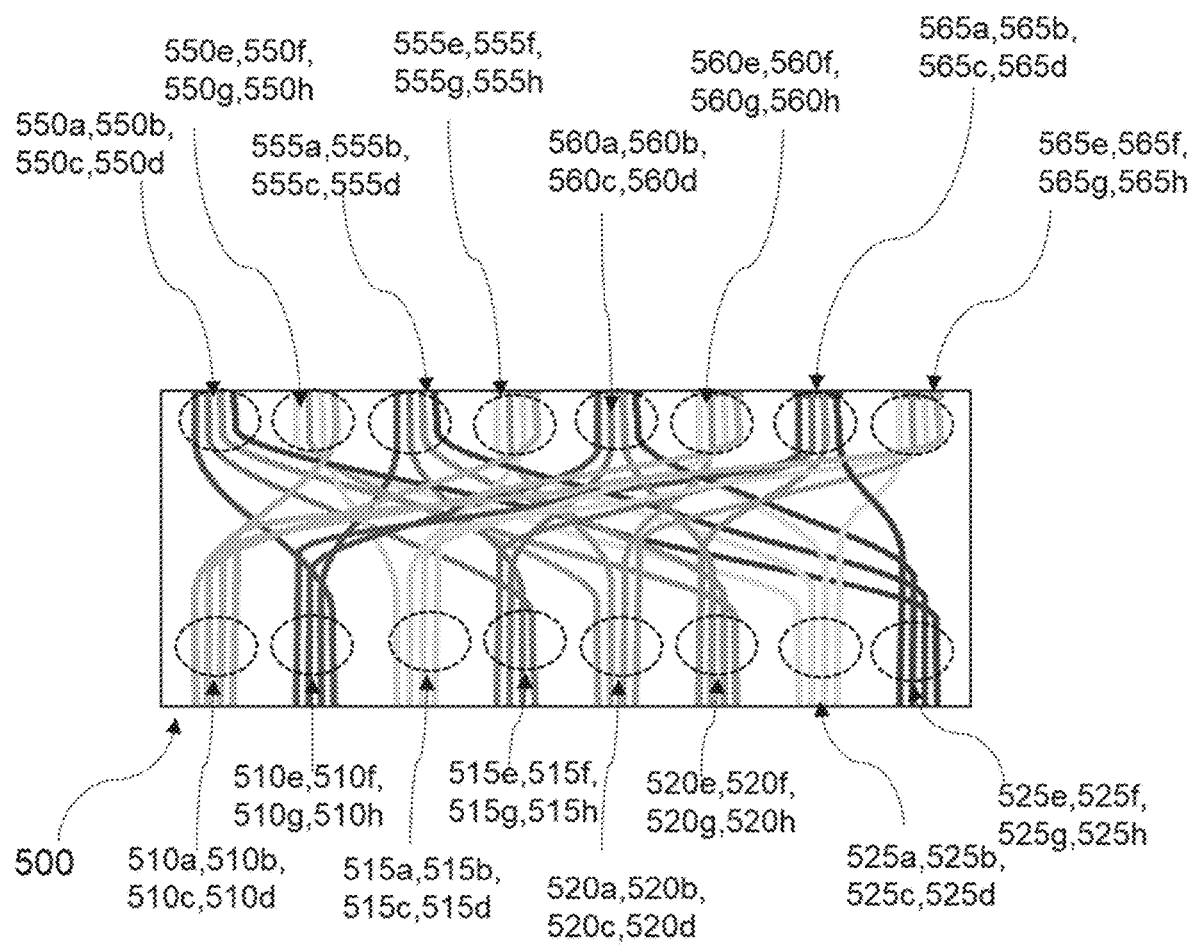
FIG. 2 shows atop view of submodule 500 showing interconnection arrangements.
Figure 3:
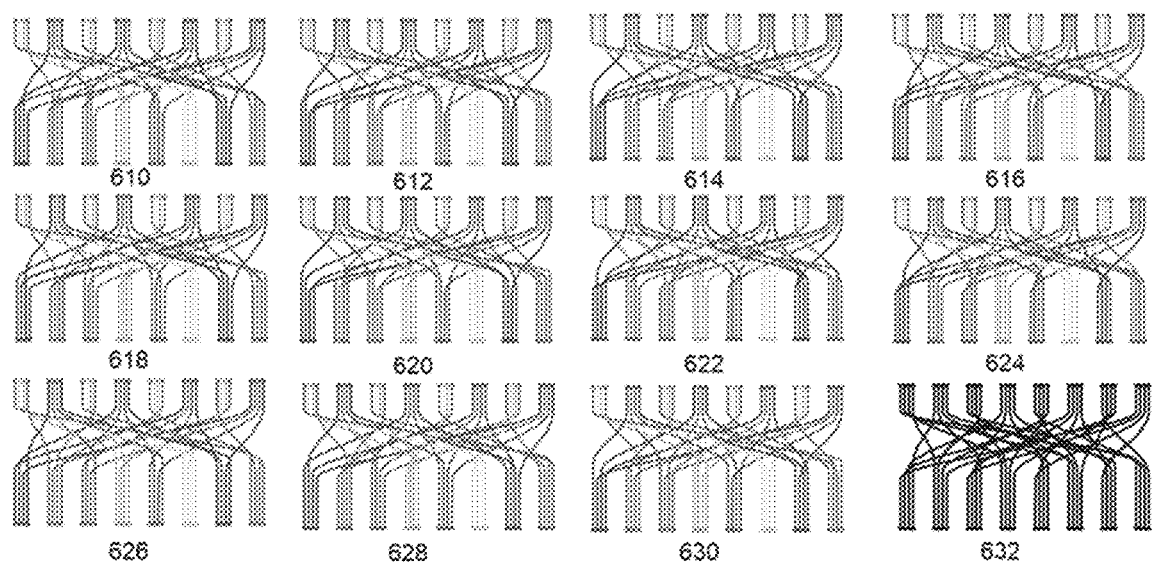
FIG. 3 shows twelve of twenty-four alternative meshes that can be implemented in the submodule 500.

FIG. 2 shows a front view of the disclosed embodiment 500, a photonic circuit chip, which is the key element in facilitating optical network deployment, reshaping, and scaling. This embodiment is used to produce the interconnection mesh of the four groups of waveguides. As shown in this FIGURE, there are eight parallel ports, 510, 515, 520, 525, 550, 555, 560, and 565, distributed on the front and rear sides of the embodiment. Each port consists of eight waveguides labeled from a to h. The mesh of submodule 500 can be implemented in twenty-four arrangements; twelve of them are shown in FIG. 3. The interconnection arrangements for all those configurations are described in Table I. Note that for the network deployments disclosed in this document, all the twenty-four arrangements are equivalent since they preserve the correct paths from the transmitter to receivers in the network. The one shown in the embodiment example corresponds to arrangement 632.

Figure 4A:
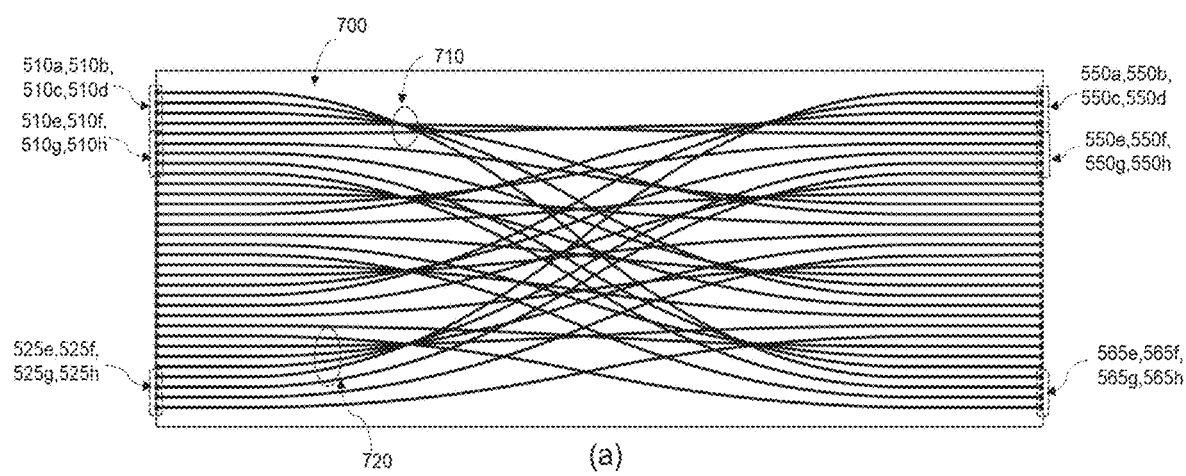
FIG. 4(a) shows atop view of DLWW Optical Chip 700.
Figure 4B:
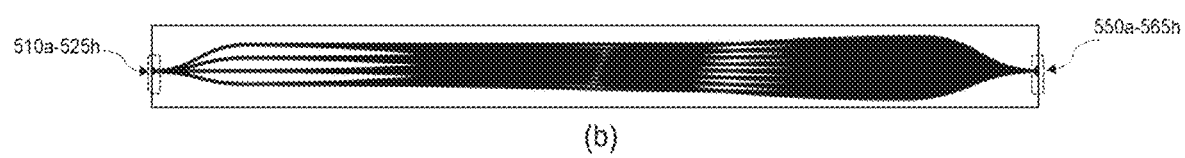
FIG. 4(b) shows a side view of DLWW Optical Chip 700 showing the different layers where the waveguides are written to avoid crossover.
Figure 5:
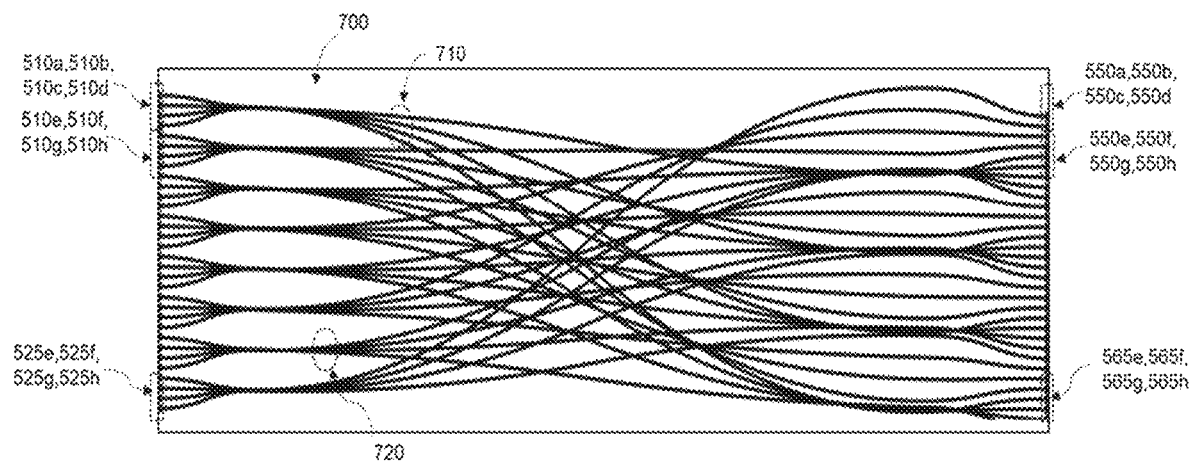
FIG. 5 shows a top view of DLWW Optical Chip 700.

FIG. 4 shows embodiment 700, a variation of arrangement 632 where all the ports are grouped in an array of fixed separation pitches, e.g., 127 µm or 250 µm. In this embodiment, the waveguides are written at different layers inside the glass, with a separation of at least 40 µm to avoid crosstalk. Some of the ports, 515, 520, 525, 550, 555, 560, and 565, are shown in the FIGURE. For example, the eight waveguides of ports 510, 525, 550, and 565 are labeled in the FIGURE. From the top view of the FIGURE, it could appear that there is crossover among waveguides, e.g., waveguides 710. However, as shown in FIG. 5, viewed from the top with a 45-degree tilt, all adjacent waveguides maintain a minimum separation. In FIG. 5, there might be crossovers among waveguides 720; however, a view of the same waveguides with a different perspective (FIG. 4(a)) shows no crossover among them.

TABLE I

| | Interconnection table of module 400 | | | | | | | | | | | |
|---|---|---|---|---|---|---|---|---|---|---|---|---|
| | 610 | 612 | 614 | 616 | 618 | 620 | 622 | 624 | 626 | 628 | 630 | 632 |
| 550a | 510e | 510f | 510g | 510g | 510e | 510f | 510h | 510h | 510f | 510e | 510g | 510h |
| 550b | 515e | 515f | 515g | 515g | 515e | 515f | 515h | 515h | 515f | 515e | 515g | 515h |
| 550c | 520e | 520f | 520g | 520g | 520e | 520f | 520h | 520h | 520f | 520e | 520g | 520h |
| 550d | 525e | 525f | 525g | 525g | 525e | 525f | 525h | 525h | 525f | 525e | 525g | 525h |
| 550e | 525d | 525c | 525b | 525b | 525d | 525c | 525a | 525a | 525c | 525d | 525b | 525a |
| 550f | 520d | 520c | 520b | 520b | 520d | 520c | 520a | 520a | 520c | 520d | 520b | 520a |
| 550g | 515d | 515c | 515b | 515b | 515d | 515c | 515a | 515a | 515c | 515d | 515b | 515a |
| 550h | 510d | 510c | 510b | 510b | 510d | 510c | 510a | 510a | 510c | 510d | 510b | 510a |
| 555a | 510h | 510e | 510f | 510h | 510g | 510e | 510f | 510g | 510h | 510f | 510e | 510g |
| 555b | 515h | 515e | 515f | 515h | 515g | 515e | 515f | 515g | 515h | 515f | 515e | 515g |
| 555c | 520h | 520e | 520f | 520h | 520g | 520e | 520f | 520g | 520h | 520f | 520e | 520g |
| 555d | 525h | 525e | 525f | 525h | 525g | 525e | 525f | 525g | 525h | 525f | 525e | 525g |
| 555e | 525a | 525d | 525c | 525a | 525b | 525d | 525c | 525b | 525a | 525c | 525d | 525b |
| 555f | 520a | 520d | 520c | 520a | 520b | 520d | 520c | 520b | 520a | 520c | 520d | 520b |
| 555g | 515a | 515d | 515c | 515a | 515b | 515d | 515c | 515b | 515a | 515c | 515d | 515b |
| 555h | 510a | 510d | 510c | 510a | 510b | 510d | 510c | 510b | 510a | 510c | 510d | 510b |
| 560a | 510g | 510h | 510e | 510g | 510h | 510g | 510e | 510e | 510g | 510h | 510f | 510f |
| 560b | 515g | 515h | 515e | 515g | 515h | 515g | 515e | 515e | 515g | 515h | 515f | 515f |
| 560c | 520g | 520h | 520e | 520g | 520h | 520g | 520e | 520e | 520g | 520h | 520f | 520f |
| 560d | 525g | 525h | 525e | 525g | 525h | 525g | 525e | 525e | 525g | 525h | 525f | 525f |
| 560e | 525b | 525a | 525d | 525b | 525a | 525b | 525d | 525d | 525b | 525a | 525c | 525c |

TABLE I-continued

Interconnection table of module 400

| | 610 | 612 | 614 | 616 | 618 | 620 | 622 | 624 | 626 | 628 | 630 | 632 |
|---|---|---|---|---|---|---|---|---|---|---|---|---|
| 560f | 520b | 520a | 520d | 520b | 520a | 520b | 520d | 520d | 520b | 520a | 520c | 520c |
| 560g | 515b | 515a | 515d | 515b | 515a | 515b | 515d | 515d | 515b | 515a | 515c | 515c |
| 560h | 510b | 510a | 510d | 510b | 510a | 510b | 510d | 510d | 510b | 510a | 510c | 510c |
| 565a | 510f | 510g | 510h | 510e | 510f | 510h | 510g | 510f | 510e | 510g | 510h | 510e |
| 565b | 515f | 515g | 515h | 515e | 515f | 515h | 515g | 515f | 515e | 515g | 515h | 515e |
| 565c | 520f | 520g | 520h | 520e | 520f | 520h | 520g | 520f | 520e | 520g | 520h | 520e |
| 565d | 525f | 525g | 525h | 525e | 525f | 525h | 525g | 525f | 525e | 525g | 525h | 525e |
| 565e | 525c | 525b | 525a | 525d | 525c | 525a | 525b | 525c | 525d | 525b | 525a | 525d |
| 565f | 520c | 520b | 520a | 520d | 520c | 520a | 520b | 520c | 520d | 520b | 520a | 520d |
| 565g | 515c | 515b | 515a | 515d | 515c | 515a | 515b | 515c | 515d | 515b | 515a | 515d |
| 565h | 510c | 510b | 510a | 510d | 510c | 510a | 510b | 510c | 510d | 510b | 510a | 510d |

The preferred embodiments in this disclosure are written in glass utilizing the DLWW method. However, with some modification to the wavelength (or wavelengths) of light, the optics to focus the beam, the repetition rate and/or the power of the femtosecond laser, it is possible to write the disclosed waveguide designs directly on polymer (enabling flexible DLWW 3D optical circuits) and silicon substrates.

More advanced technology may allow the waveguide to be written utilizing multiple wavelengths or variable reputation rates as the laser applies focus through the glass—this can provide waveguides with variable width or refractive index/contrast (i.e. the difference between the refractive index of the waveguide and the surrounding glass). Changing the diametrical spot size of the laser dynamically while maintaining power density allows you to change the diameter of the waveguide, while keeping the index refraction constant or variable, depending on the application. For example, up taper or a down taper that's useful for things like mode conversion, mode matching, mode filtering, stripping out modes and even multimode waveguides.

Figure 6:
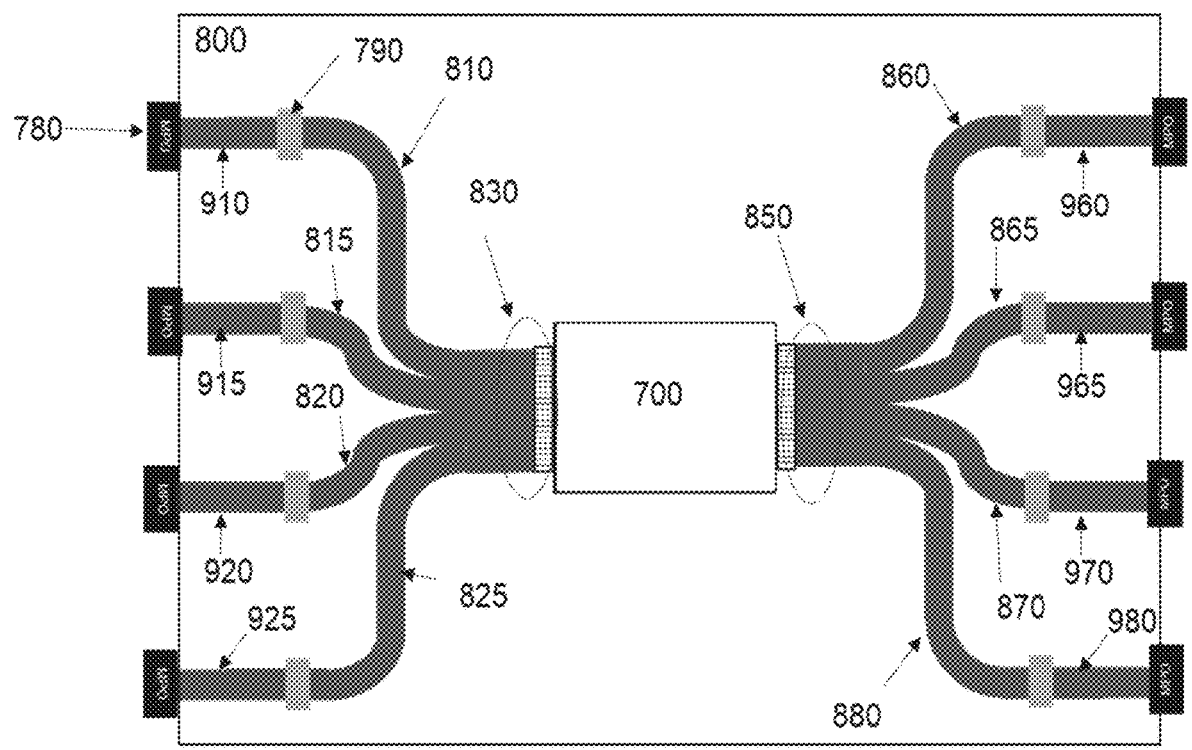
FIG. 6 shows an exemplary of module 900 shows connection to DLWW embodiment 700 to two fiber arrays and the connection to the multifiber ports of the module.

FIG. 6 shows an example of how to use DLWW embodiment 700 or (500) in an assembly or module 800, which is an enclosure that supports and protects the PLC 700, have front and rear opening for optical interfaces (connectors or adaptors), and features to organize the fiber interconnections. One or more faces of the module have multiport connectors such as MPOs, MMC, or groups of SN, MDC, or alternatively, groups of duplex connectors such as LC connectors. In the FIGURE, module 900 has eight MPO ports evenly distributed on the front and back sides of the device.

The outputs of DLWW device 700 are connected to fiber arrays 830 and 850. The fiber arrays, commonly used to couple light into and out of PLCs, consist of one or two-row arrays of optical fibers placed on a high precision v-groove chip which is covered with a lid on the top. The end face of the fiber array is optically polished, and it can be purchased with a flat or angled polished end face with or without antireflection coating (ARC). In the disclosed invention, the fibers from 830 are separated into groups, 810, 815, 820, and 825. Similarly, from the other side of the DLWW device 700, the group of fibers from 850 is separated into groups 860, 865, 870, and 875.

The fiber groups 810, 815, 820, and 825 are connected to fiber groups 910, 915, 920, and 925, respectively, using fusion or mechanical splices represented by 790. In other designs with less restricted values for insertion loss, element 790 can also be a mated multifiber connector pair. Fibers 910, 915, 920, and 925 are terminated in multifiber connectors or groups of duplex connectors placed on the front or rear face of module 800.

Similarly, the fiber groups 850, 855, 860, and 865 are connected to fiber groups 950, 955, 960, and 965, respectively, using fusion or mechanical splices or connectors represented by 790. Fibers 950, 955, 960, and 965 are terminated in multifiber connectors or groups of duplex connectors placed on the rear or front face of module 800.

Modules with several ports and DLWW devices, the fiber groups 850, 855, 860, and 865 are connected to fiber groups 950, 955, 960, and 965, respectively, using fusion or mechanical splices or connectors represented by 790. Fibers 950, 955, 960, and 965 are terminated in multifiber connectors or groups of duplex connectors placed on the rear or front face of module 800.

Figure 7:
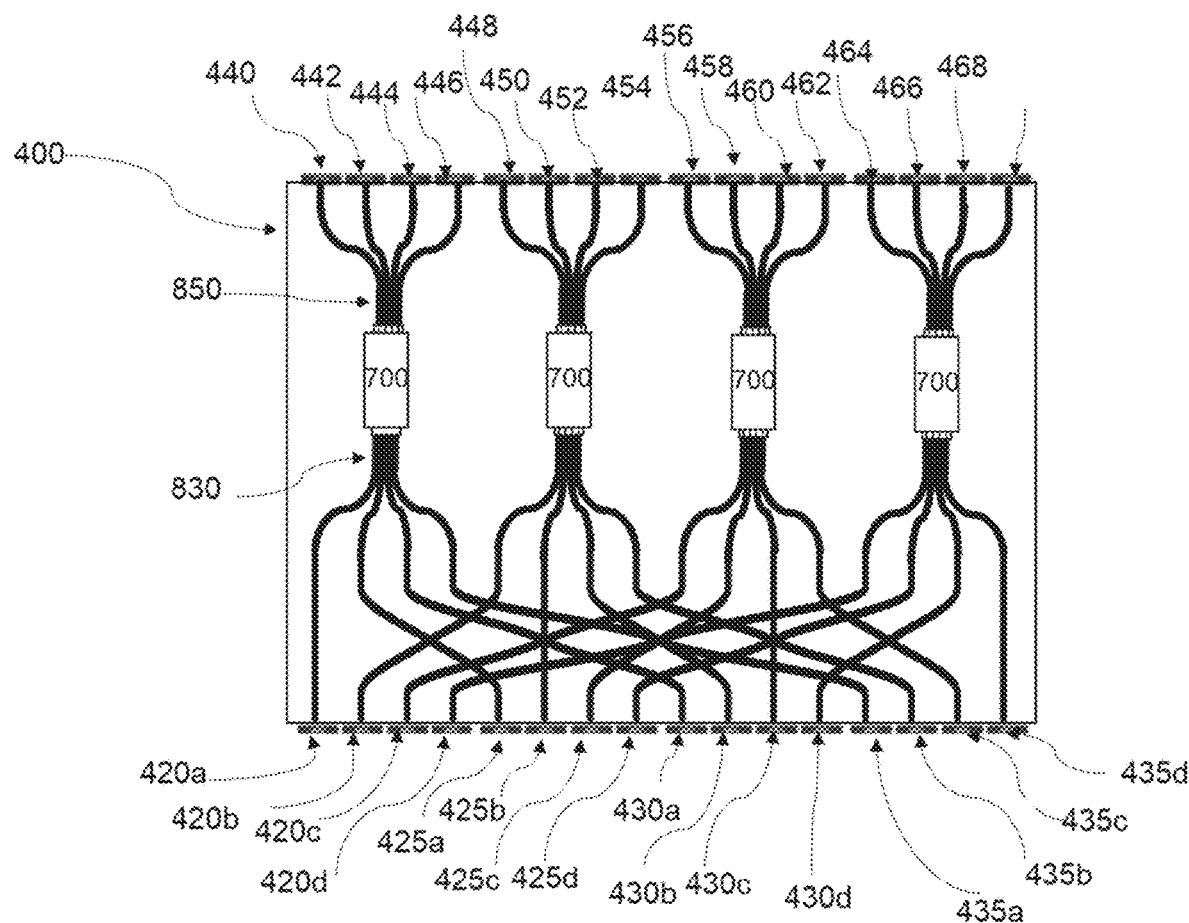
FIG. 7 shows an exemplary of module 400 shows connection to DLWW embodiment 700 to fiber arrays and the connection to the multifiber ports of the module.
Figure 8:
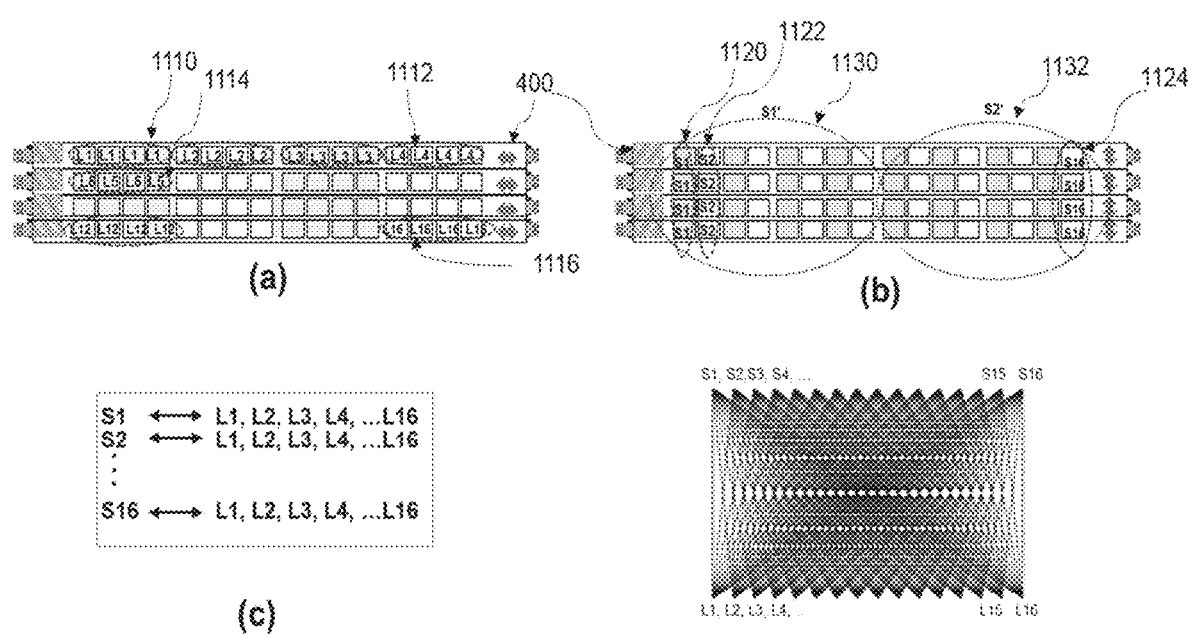
FIG. 8 illustrates a simple method for implementing networks with 16 Leaf Switches and up to 16 Spine switches, using the modules 400.

Module 800 incorporates a simple mesh that can support up to four Spines and four Leaf switches. Larger meshes can be implemented using methods shown in RS25595 and DLWW device 700. For example, a two-step mesh incorporated, by combining two sections where a mesh is applied to a group of fibers and then to individual fibers as shown in FIG. 7 and in more detail in RS25595, increases the degree of mixing of the fiber channels inside each module. This simplifies the deployment of the network since a significant part of the network complexity is moved from the structured cabling fabric to one or more modules 400. Table II, which shows the mesh configuration of module 400, indicates that any of the sixteen parallel ports is connected to all the other parallel ports using one duplex channel. For example, in the first column of the table it is shown that port 440 is connected to 420a, 425a, 430a and 435a. By grouping several modules 400 and following simple rules to connect a group of uplinks or downlinks horizontally or vertically the installation becomes cleaner, and cable management is highly improved. For example, FIG. 8 shows a stack of four modules 400, each one with four photonic device 700. Part (a) of the FIGURE shows the module side that is connected to the Leaf switches. For simplicity, we label this as the front side. Part (b) shows the opposite side of the same module 400, the backside, which is connected to the Spine switches. It is assumed that sixteen Leaf switches, each with four MPO uplinks, need to be connected to the fabric shown in part (d) of the FIGURE. In this illustrative example, where it is assumed that sixteen Leaf switches with four uplink each need to connect to the fabric, the connection method is described as follows. Each with the uplinks of the Leaf switches are connected horizontally in groups of four until the last port of each module 400 is used. For example, 1110 and 1112, the first and the last fourth ports of the first module 400 connect to the uplink ports of the Leaf switches L1 and L4, respectively. The uplinks of the fifth Leaf switch populate the ports 1114 of the second module 400. This method continues until the uplinks of the last Leaf switch are connected to the ports 1116. The Spines ports are assigned at the backside of the stacked modules 400. For example, if standalone Spine switches are used, 1120, 1122, and 1124 correspond to ports of the first, second, and sixteenth Spine switch, respectively, labeled as S1, S2, and S16.

TABLE II

Mesh configuration of module 400

| 440 | 442 | 444 | 446 | 448 | 450 | 452 | 454 | 456 | 458 | 460 | 462 | 464 | 466 | 468 | 470 |
|---|---|---|---|---|---|---|---|---|---|---|---|---|---|---|---|
| 420a | 420a | 420a | 420a | 420b | 420b | 420b | 420b | 420c | 420c | 420c | 420c | 420d | 420d | 420d | 420d |
| 425a | 425a | 425a | 425a | 425b | 425b | 425b | 425b | 425c | 425c | 425c | 425c | 425d | 425d | 425d | 425d |
| 430a | 430a | 430a | 430a | 430b | 430b | 430b | 430b | 430c | 430c | 430c | 430c | 430d | 430d | 430d | 430d |
| 435a | 435a | 435a | 435a | 435b | 435b | 435b | 435b | 435c | 435c | 435c | 435c | 435d | 435d | 435d | 435d |

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus having a plurality of optical duplex and parallel connector adapters where the apparatus incorporates an internal photonic circuit with a mesh, wherein the light path of each transmitter and receivers is matched in order to provide proper optical connections from transmitting to receiving fibers, wherein the connector adapters are associated with inputs and outputs and further wherein every input is connected to every output and every output is connected to every input.

* * * * *